United States Patent [19]

Hartness et al.

[11] Patent Number: 4,830,173

[45] Date of Patent: May 16, 1989

[54] INDEXING APPARATUS FOR ALIGNING ARTICLES IN PARALLEL ROLLS

[75] Inventors: Thomas S. Hartness; John M. Koffskey, both of Greenville, S.C.

[73] Assignee: Hartness International, Inc., Greenville, S.C.

[21] Appl. No.: 120,596

[22] Filed: Nov. 13, 1987

Related U.S. Application Data

[63] Continuation-in-part of Ser. No. 887,245, July. 21, 1986 Pat. No. 4,723,649.

[51] Int. Cl.$^4$ ............................................. B65G 47/26
[52] U.S. Cl. ................................. 198/442; 198/463.4
[58] Field of Search .............. 198/367, 368, 442, 425, 198/836, 463.4, 464.1, 503, 437, 463.6, 836

[56] References Cited

U.S. PATENT DOCUMENTS

| | | | |
|---|---|---|---|
| 1,508,369 | 9/1924 | Johnson | 198/463.6 |
| 3,193,078 | 7/1965 | Amenta et al. | 198/442 X |
| 3,462,823 | 8/1969 | Heisler | 198/463.4 X |
| 3,599,779 | 8/1971 | Coe | 198/463.4 X |
| 3,767,026 | 10/1973 | Pagdin et al. | 198/442 |
| 3,882,006 | 7/1974 | Shuttleworth | 198/442 X |
| 4,066,163 | 1/1978 | Rowekamp | 198/442 |
| 4,147,248 | 4/1979 | Kurczak et al. | 198/442 X |
| 4,616,745 | 10/1986 | Hartness | 198/442 |

FOREIGN PATENT DOCUMENTS

84/01559 4/1984 PCT Int'l Appl. .............. 198/463.6

Primary Examiner—Robert J. Spar
Assistant Examiner—D. Glenn Dayoan
Attorney, Agent, or Firm—Dority & Manning

[57] ABSTRACT

There is disclosed an apparatus for aligning articles in parallel rows as the articles are being moved forward on a conveyor in a single row. A plurality of spaced apart dividers are provided for defining parallel lanes into which the articles are to be conveyed. A pivotally mounted guide chute is used for directing the articles into the respective parallel lanes. The guide chute can be readily exchanged for another guide chute by merely disconnecting various quick release mechanisms. A fixed frame member is carried above a conveyor which transports the articles and is used for supporting the guide chute. The guide chute includes a top plate which has a forward end that is pivotally mounted on the fixed frame member. A plurality of stops are carried on the top plate and are spaced apart a predetermined distance corresponding to the spacing between the various parallel lanes. Indexing mechanism is provided for indexing the guide chute between the various lanes.

In order to control the flow of articles through the guide chutes to the throat of the lanes, pivotally mounted shoes are carried adjacent the outer end of the space rails forming the guide chute. These shoes, when in a first position, extend the length of the guide rail by means of planar side surfaces. When the shoes are shifted to a second position, a curved trailing surface provided on the shoes enter the path of travel of the articles between the rails, preventing the articles from passing between the rails.

9 Claims, 4 Drawing Sheets

INDEXING APPARATUS FOR ALIGNING ARTICLES IN PARALLEL ROLLS

This application is a Continuation-In-Part application of Ser. No. 887,345, now U.S. Pat. No. 4,723,649, filed in the United States Patent Office on July 21, 1986 listing Thomas S. Hartness and E. Leon Hopkins as the inventors.

FIELD OF THE INVENTION

This invention relates to an apparatus for automatically dividing articles conveyed single file on an article packing machine into a plurality of parallel lanes or rows.

BACKGROUND OF THE INVENTION

In the article loading machines and specifically in bottle handling machines, bottles are typically conveyed on a conveyor in a commingled manner. It is often necessary to separate the articles into aligned parallel rows for further conveyance of the articles to a packing station. At the packing station the bottles are often packed in the containers which are partitioned. The separation of the articles or bottles into parallel rows by indexing means facilitates the packing of the bottles into the containers or cartons. Aligning of the commingled bottles into parallel rows is a problem to which considerable attention is given in the bottling and canning industry.

Prior bottle handling machine such as the case packing machine shown in U.S. Pat. Nos. 3,481,108 and 3,555,770 use a plurality of parallel spaced guide rails for separating a commingled group of bottles into aligned parallel rows. Often, however, the bottles become tilted on the conveyor and fall over in front of the guide rails, causing the bottles to jam up in front of the guide rails and requiring the stopping of the conveyor and repositioning of the bottles in an upright position by a machine attendant. U.S. Pat. No. 4,029,195 discloses cone shaped guide members which wedge the tilted bottle into an upright position so that they may be guided individually into parallel rows between the space rails.

Swing arm article guiding chutes have been disclosed for use on bottle loading packing machines to feed the bottles into lanes. One proposed swing arm device was manufactured by Vickers Miller/Hydro Manufacturing Company of Benbridge, Ga. To swing the chute, optical sensors activated electrical solenoid switches which, in turn, control an electric motor to swing the chute across the conveyor. A piston rod operated by an air cylinder provides a gate to hold the leading bottles in the chute until a lane is reached. The optical/solenoid control swing arm device is complicated and expensive owing to the electrical wiring and other electrical elements required.

In U.S. Pat. No. 4,616,745, there is disclosed an apparatus for aligning and feeding articles upright on an article loader machine. In this particular device, a guide chute is utilized for directing the articles into a particular lane. The number of articles being fed into a lane are under control of a computer and upon reaching the desired number of articles in that particular lane, solenoid valves are activated to control the operation of a plurality of air cylinders which index the guide chute to a particular lane. During the indexing operation, jaws which are manipulated by pneumatic cylinders are used for gripping the articles to hold the articles within the chute. There is also provided another article engagement means which engages an upper portion of the article such as the neck of the bottle so that the bottles are held upright when the lower body portions of the articles are engaged by the contoured jaws during the indexing operation. While the jaws 92 and 94 do secure the foremost article in the chute in a positive manner as a result of their arcuate inner surface, when the chute is feeding articles in one of the extreme side lanes, there is very little control of the bottle between the end of the guide chute and the entrance to the particular lane where it is being fed. Another problem with the article loading device disclosed in U.S. Pat. No. 4,616,745 is that it must be adjusted to accommodate various sized articles and if due care is not taken while making this adjustment, then there will be malfunctions during this indexing operation.

Accordingly, an important object of the present invention is to provide an apparatus for feeding a predetermined number of articles into parallel lanes and during the indexing operation between lanes, the articles are positively held in place.

Another important object of the present invention is to provide an article retaining means for a guide chute wherein the lead article is positively held at a precise location during the indexing mechanism and the same article retaining means is used for guiding the articles into the lanes.

Still another important object of the present invention is to provide a simple and relatively uncomplicated guide chute for articles which can be readily changed for substituting a different guide chute having different dimensions.

Still another object of the present invention is to provide a reliable and relatively simple apparatus for aligning articles in parallel rows.

SUMMARY OF THE INVENTION

The present invention pertains to an apparatus for aligning articles in parallel rows as the articles are being moved forward on a conveyor in a single row. There are a plurality of spaced dividers positioned above the conveyor which define a plurality of parallel lanes. A pivotally mounted guide chute having an inlet and outlet is provided for guiding the articles into a respective lane. The articles are fed into an entrance end of the guide chute by means of a pair of vertically extending spaced guide plates positioned above the conveyor. The outer end of the guide chute is positioned adjacent the entrance of the lanes into which the bottles or articles are being fed.

The guide chute is supported on a fixed frame member which is carried above the conveyor. Positioned on top of the frame member is a top plate which is pivotally attached by means of a pin adjacent the forward end thereof. A plurality of stops are carried on the top plate which are spaced apart at predetermined distances corresponding to the spacing between the spaced apart dividers. A main power operated cylinder is provided for pivoting the outlet end of the guide chute about an arcuate path to different positions. The stops positioned on top of the top plate are located on an arcuate path which corresponds to the arc of travel of the outer end of the guide chute.

An indexing mechanism which cooperates with the main power operated cylinder is provided for indexing the outlet end of the guide chute from alignment with one lane to another lane.

The indexing mechanism includes a movable post which can be moved from an extended position wherein it engages one of the stops carried on the top plate to a retracted position wherein it permits the main power cylinder to index the top plate and guide chute to the next position.

Means is provided for selectively activating the indexing means to move the post to and from the extended and retracted positions when indexing the outer end of the guide chute from alignment with one lane to the next lane.

A quick release pivot connects the forward end of the top plate to the fixed frame member so as to permit readily changing of one guide chute for another. The other end of the top plate opposite from the end in which the pivot is connected has a plurality of channel members provided thereon into which a support plate carried by the fixed frame member extends. This permits the outer end of the top plate to be securely guided during the pivoting operation. When it is desired to change the guide chute, it is only necessary to remove the quick release pivot and the pneumatic hoses, the sensor and lift the top plate along with the frame and guide chute from the apparatus.

The number of articles that are fed successively into the parallel lanes is under control of a microcomputer and as the articles pass through the guide chute, a signal is generated by a counting mechanism which includes a fiber optic sensor. When a predetermined number of articles pass in a particular lane, a pair of pivotally mounted shoes carried adjacent the outer end of the guide chute are moved from a guiding position to a position wherein they retard the movement of articles through the guide chute. Simultaneously therewith, in some particular embodiments, an elongated retaining member is utilized in conjunction with the shoes for stopping the movement of articles through the guide chute during the indexing operation of the guide chutes.

The shoes which are carried on the end of the guide chute are adapted to be pivoted between a first position wherein a planar side surface acts as an extension of the elongated spaced guide rails and a second position wherein a curved trailing surface enters the path of travel of the articles between the rails preventing the articles from passing between the rails.

Interposed between the curved surface of the shoe and the planar side surface is an angle surface. The purpose of the acute angle surface is to prevent the shoe from kicking an article forward as the shoe is being shifted in a rapid manner between the first and second positions.

DESCRIPTIONS OF THE DRAWINGS

A construction designed to carry out the invention will be hereinafter described, together with other features thereof. The invention will be more readily understood from a reading of the following specification and by reference to the accompanying drawings forming a part thereof, wherein an example of the invention is shown, and wherein.

DESCRIPTION OF PREFERRED EMBODIMENT

Figures 4, 5:
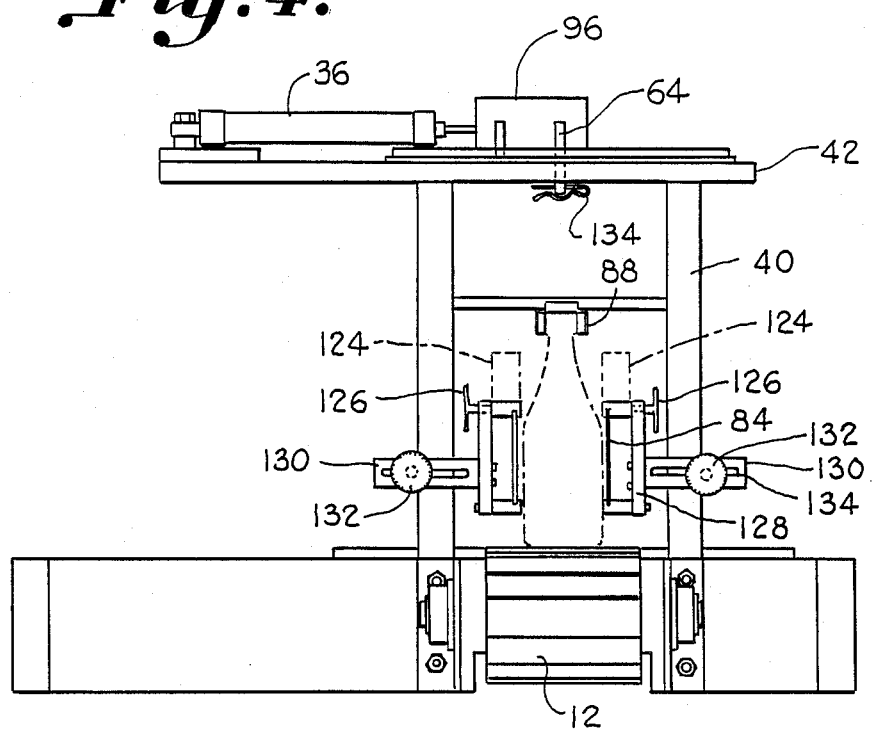
FIG. 4 is an end elevational view 4—4 of FIG. 1.
FIG. 5 is a sectional view taken along line 5—5 of FIG. 2 showing the different positions of the shoes during guiding and retarding of the articles passing therethrough.

Referring now in more detail to the drawings and in particular FIG. 4, there is illustrated an article loading machine that is provided for aligning articles such as bottles 10 that are being fed on an incoming conveyor 12 to another conveyor system 14 which transports the articles to the right. As the articles 10 are transported to the right, they are passed through a guide chute generally designated by the reference character 16 which directs the articles into lanes 18a, 18b, 18c and 18d. The lanes are defined by vertically extending space divider plates 20.

In the embodiment illustrated, the articles are bottles. However it is to be understood, that the article loading machine could be used for aligning any type of articles such as cans, short bottles, etc.

The conveyor belt 14 is carried on a roll 22 that has a shaft 24 extending out an end thereof that is journaled in a bearing block 26. The bearing block 26 is supported on a side frame member 28. Adjacent the center of the conveyor system is another conveyor belt 30 that is wrapped around a roll that is in turn supported on bearing 34. The conveyor belts may be driven by any suitable mechanism (not shown) for transporting the bottles from between the incoming vertical divider plates 36 and 38 to the parallel lanes 18a and 18b, etc.

The guide chute 16 is used for guiding the bottles into the respective lanes as a result of being pivoted by a main pneumatically operated cylinder 36 and an indexing cylinder 38. The guide chute 16 is pivotally secured to a fixed frame member. The fixed frame member includes vertically extending posts 40 which have the lower end connected to the main frame 42 of the article loading machine which extends between the side frames 28. Connected to the upper portion of the post 40 is a horizontally extending frame member 42. A longitudinally extending plate 44 has one end connected to the frame member 42 and the other end is fixed by bolts to a horizontally extending guide plate 46. This guide plate 46 has an arcuate cut-out inner surface 48 upon which a top plate 50, forming part of the guide chute, rides as the guide chute 16 is being indexed. The arcuate guide plate 46 is, in turn, supported on fixed braces 52. The braces are in turn supported on fixed frame member 54 which extends upwardly from the side main channel braces 28. The vertically extending frame member 54 is provided for supporting the divider plates 20 which define the lanes 18a through 18b. The upper ends of the divider plates 20 have holes extending therethrough, through which a threaded rod 55 extends. Nuts 56 are carried on the threaded rod 55 and by rotating such nuts 56 the position of the divided plates can be adjusted for varying the spacing between the plates and, as a result, the width of the lanes into which the bottles are to be fed may be varied.

Often times, when packaging articles, the size of the articles will vary, requiring a guide chute having a different spacing between the guide rails 60 and 62.

The top plate 50, which forms part of the guide chutes, is pivotally attached to a horizontally extending frame member 42 by means of a pin 64. The other end of the top plate rides on the arcuate guide plate 46 as a result of the arcuate surface 48 extending into a channel provided in a channel member 66 carried on the lower side of the top plate 50. There are at least two channel members 66 used for guiding the pivotal movement of the top plate 50. The channel members 66 may be constructed of any suitable material such as high molecular weight polyethylene or nylon.

The elongated spaced rails 60 and 62 are supported through vertically extending braces 68, 70, 72, 74 and horizontally extending members 76, 78, 80 and 82. Bolts extend through the horizontally extending members to engage the upper surface of the rails 60 and 62.

Figure 2:
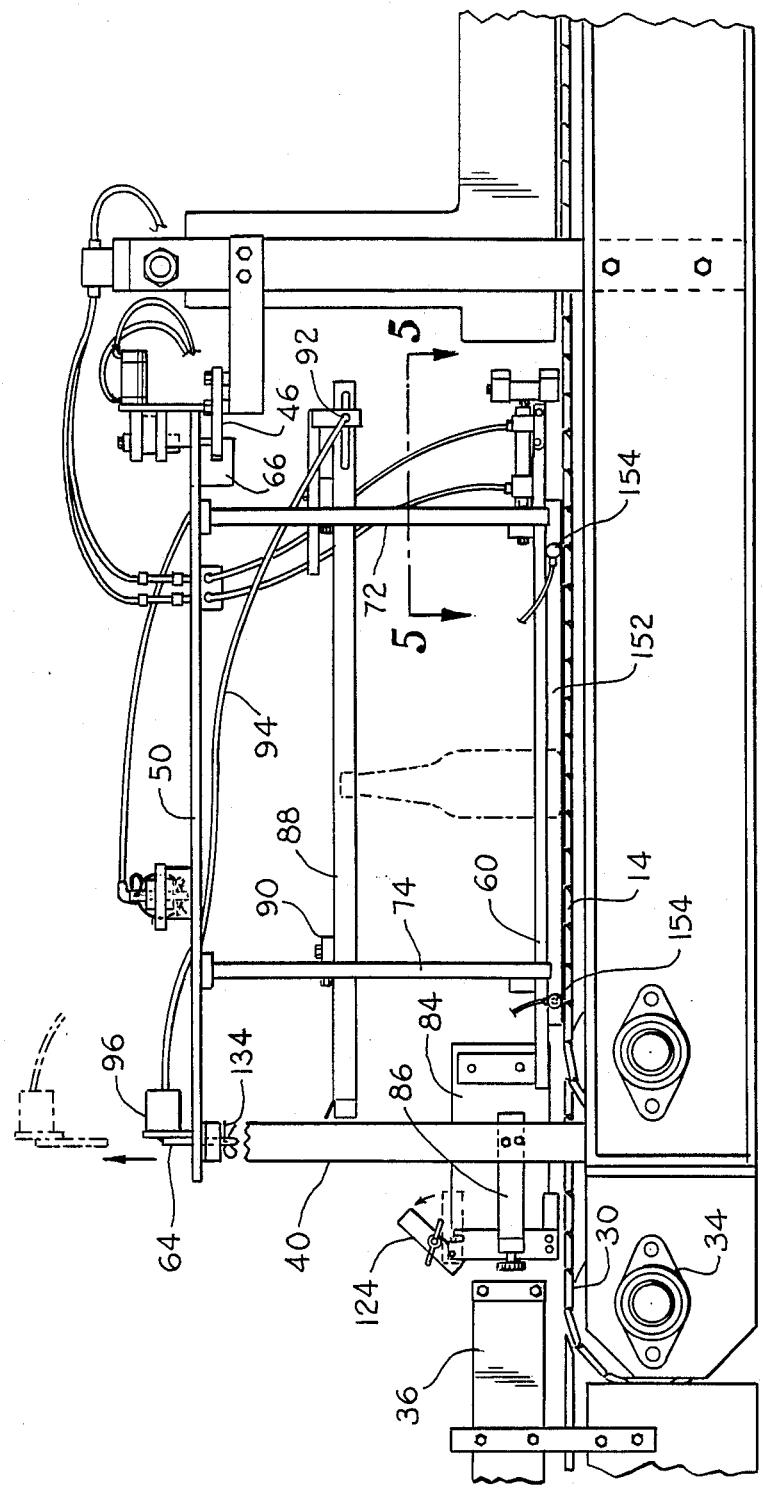
FIG. 2 is a side elevational view of the apparatus shown in FIG. 1.

The inner end of the rails 60 and 62 are fixed to flexible guide plates 84 that are carried adjacent the forward end of the guide chute. The guide plates 84 are constructed of any suitable flexible material so as to permit the guide rails 60 and 62 to pivot with the top plate, and as the guide rails pivot, the flexible guide plates 84 flex in the direction of pivoting. The flexible guide plates 84 are, in turn, also fixed to the fixed post 40 by means of the frame 86 as best shown in FIG. 2. The leading edge of the flexible guide plate 84 terminates adjacent the spaced guide rails 36.

When long neck bottles are being fed through the guide chute 16, the top portion of the bottle as shown in FIG. 2 rides in a channel shaped member 88 that has an opening facing the conveyor 14 for aiding in holding the bottle upright as it is being moved along by the conveyor 14. The channel shaped member 88 is fixed to horizontally extending braces 90 that extend between the vertical braces 68 and 74.

Positioned adjacent the right hand end of the channel shaped guide member 88, as shown in FIG. 2, is an electric eye 92 that is used for counting the bottles being moved through the guide chute. The electric eye 92 detects the bottle and, through a fiber optic member 94, sends a signal to a box 96 containing the fiber optic circuitry and counter. The box containing the fiber optic counter and circuitry 96 is fixed to the top plate by means of a pin 98. Wires extend from the fiber optic counter 96 to a microprocessor, which is not shown, that is use for programming the number of articles that pass through the guide chute into a respective lane before the indexing of the guide chute takes place. Any suitable microprocessor can be utilized in conjunction with the fiber optic counter mechanism 96.

A pair of shoes 100 and 102 are pivotally attached to the outer end of the guide rails 60 and 62 for retarding the movement of articles through the guide rails 60 and 62 when in one position and for guiding the articles from the guide rails into a respective lane 18a and 18b, etc., when in another position. As shown in FIG. 5, the locking shoes 100 and 102 are pivotally attached to the guide rails by means of pivot pins 104 and 105 respectively. The locking and guide shoes 100 and 102 are manipulated by means of double acting pneumatic cylinders 106 and 108. A piston 110 extends out of the end of the pneumatic cylinder 106 and is secured to the locking and guide shoe by a pivot pin 112.

Figure 1:
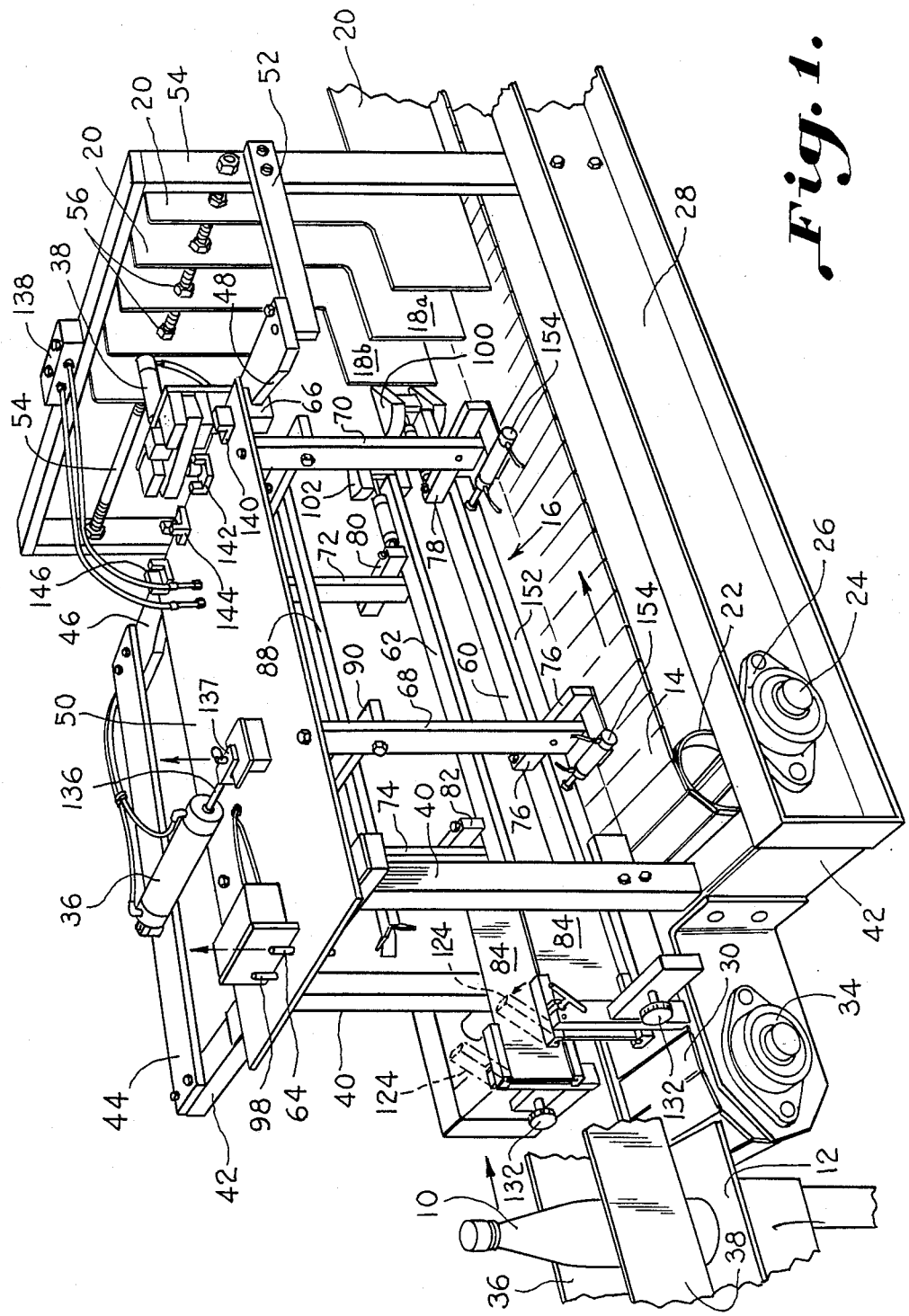
FIG. 1 is a perspective view of one embodiment of an apparatus constructed in accordance with the present invention for aligning articles in parallel rows.

Each of the shoes 100 and 102 has an elongated planar side surface 114 and a curved trailing surface 116. The curved surface 116 corresponds to the curvature of the bottle or article passing through the guide chute. Interposed between the elongated side surface 114 and the curved surface 116 is an angle surface 118. The angle surface 118 makes an acute angle relative to the planar side surface. The acute angle is approximately 30 degrees. As can be seen in FIG. 1, each of the shoes 100 and 102 includes a pair of shoes, one spaced above the other for providing more guiding and retarding surfaces.

Air is supplied to the pneumatic cylinders 106 and 108 through the ports 120 and 122 to either extend or retract the piston 110 extending out the end thereof. When the piston is extended, the shoes 102 and 100 are moved to the phantom line position, such as shown in FIG. 5, wherein the planar side walls 114 make an extension of the guide rails 60 and 62 to guide the articles passing through the guide chute to the entrance or the mouth of the lanes 18a, 18b, etc. As a result, no lateral movement of the articles takes place as the articles are shifted into the lanes. This permits more accurate counting o sensing of the articles as they are fed into the lanes.

When it is time for the guide chute to be indexed to the next lane, air is supplied to the ports 122 of the pneumatic cylinders 106 and 108 to move the guide shoes 100 and 102 to the position shown in full lines in FIG. 5. In this position, the arcuate surfaces 116 engages the next bottle or article passing through the chute to stop the forward movement of the articles through the chute.

The purpose of the angle surface 118 provided on the leading edge of the shoe is to allow sufficient space to keep the forward end of the shoe from kicking the article that just passed between the shoes forward. The reason for this is that the pneumatic cylinders 106 and 108 quickly pivot the shoes from the phantom line position shown in FIG. 5 to the full line position and since the shoes move much faster than the articles moving on the conveyor if the angle surface was not provided as at 118, sometimes they would strike the bottle just passing therethrough and cause the same to tip over.

As best seen in FIGS. 2 and 4, flexible guide plates 84 are connected to the inner ends of the guide rails 60 and 62. They are secured to the vertical frame members 40 by means of a pivotal channel shaped member 124 that is locked in position by a screw 126. The screw 126 is in turn carried on a vertically extending brace 128 that is fixed to a horizontally extending bracket 130. The position of the bracket 130 can be adjusted by manipulating the knob 132 that extends through an elongated slot 133 provided in the brace 130. The purpose of the U-shaped channel connectors 124 is to permit quick removal of the flexible guide extensions 84 when changing the guide chute.

As also seen in FIGS. 2 and 4, a removable clip 134 extends through a hole provided in the pivot pin 64 for releasably securing the top plate 50 to the horizontally extending frame member 42.

The mechanism for controlling the indexing of the guide chute from one lane to the next includes the main power cylinder 36 which is a double acting pneumatically operated cylinder that has a piston rod 136 that extends out the end thereof. The outer end of the piston rod is pivotally secured to the top plate 50 by means of a quick disconnect pivot connection 137. The pneumatic cylinder 36 is under control of a conventional manifold valve 138 which controls the flow of air to all of the pneumatic cylinders forming part of the apparatus. The manifold valve is, in turn, under control of a microprocessor which controls the indexing and the entire function of the apparatus. When the guide chute is being indexed in one direction, air is supplied to one of the ports of the main cylinder 36 and when reversing the direction of indexing the guide chute, air is supplied in the other direction. In order to make a quick reversal from one direction to the other, when the guide chute is indexed to the outer most lane, the chute is locked in this position and the air is reversed in the main cylinder. The air is allowed to build up so that upon releasing the indexing mechanism, the main cylinder will shift the guide chute to the next lane without any delay.

The indexing mechanism is under control of the indexing cylinder 38 that is supported on the fixed frame member. The indexing cylinder 38 is a double acting cylinder and has a piston rod extending out of the end thereof upon which a downwardly extending post is provided. This post is shifted from an extended to a retracted position for allowing the main cylinder 36 to index the guide chute between the various lanes as controlled by the stops 140, 142, 144 and 146 that are carried on top of the top plate. The stops are provided in an arcuate path for being engaged by the pin carried on the end of the indexing cylinder 36.

Figure 3:
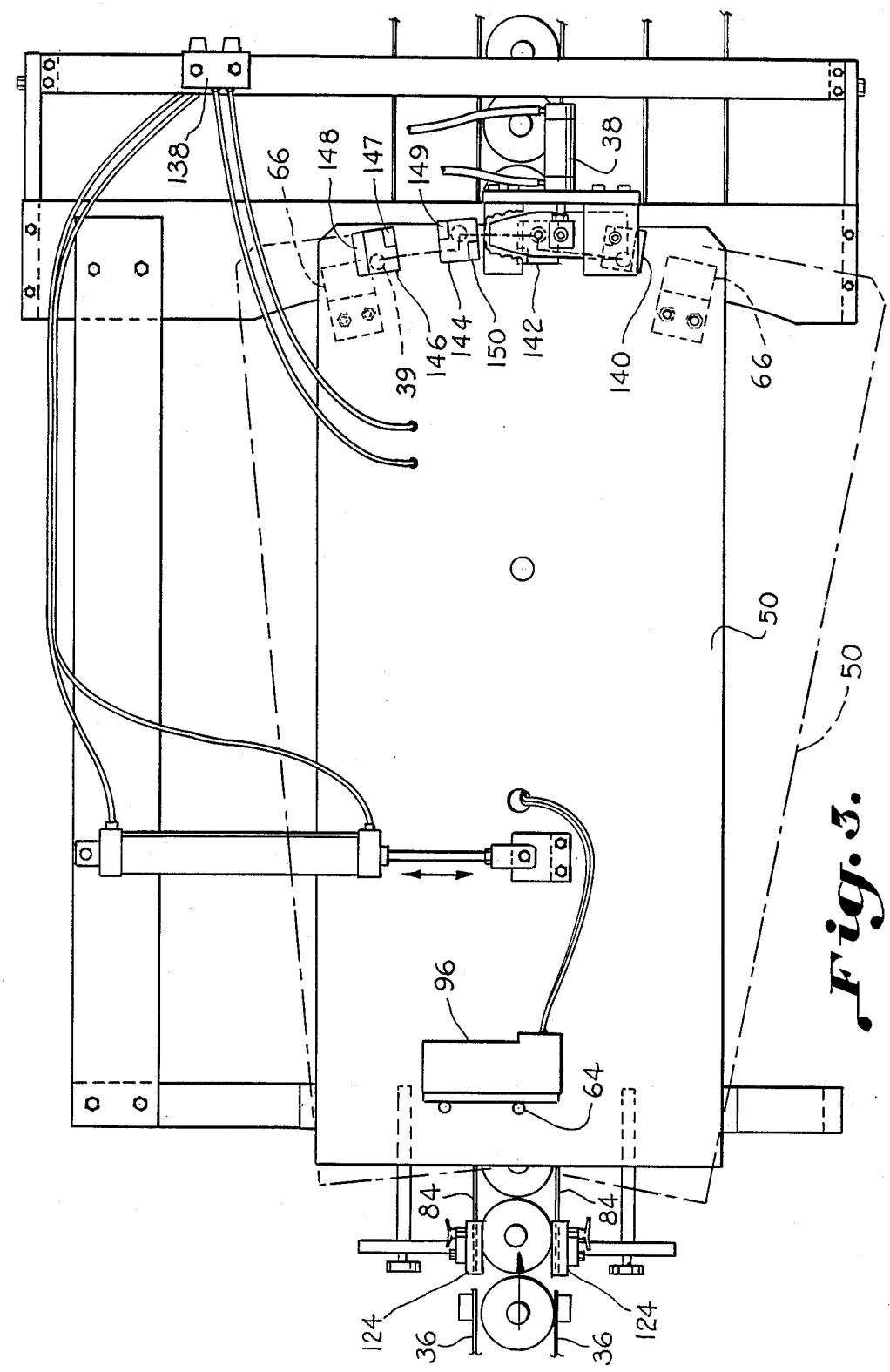
FIG. 3 is a top plan view of the apparatus disclosed in FIG. 1.

As shown in FIG. 3 of the drawings, each of the stops 140 through 144 include a pair of vertically extending abutments. The stops 142 and 144 both have two offset vertically extending abutments 149 and 150 that extend approximately half the depth of the stop. The stops 140 and 146, on the other hand, include a half length vertical abutment 147 and a full length vertical abutment 148.

When indexing the guide chutes, if the guide chute is in the end position, the post carried on the end of the indexing cylinder 38, which is identified by the reference character 39, is locked between the two abutments 147 and 148. In order to release the guide chute so that it can move from the full line position as shown in FIG. 3, in the direction of the top of the paper, it is necessary for the indexing cylinder 38 to move the posts 39 outward to the phantom line position shown in FIG. 3. When in this position, air is supplied to the main cylinder to the port opposite the end from which the piston rod extends to force the top plate 50 downwardly. The top plate moves down until the post 39, strikes the abutment 150 carried on the stop 144. Upon striking the abutment stop 150, wherein the guide chute is in alignment with the second from the end lane, a predetermined number of bottles are fed into this lane and the fiber optic device counts the bottles entering into the lane. Upon a predetermined number being entered into the lane, a signal is sent to the microprocessor which, in turn, causes the indexing cylinder 38 to retract the post and allow the top plate and guide chute to be shifted to the next stop 142 wherein the guide chute is alignment with the next lane.

Each time the electric eye 92 counts the predetermined number of articles that are to pass into a particular lane, it triggers a microprocessor. The microprocessor, in turn, sends a signal to the manifold valve 138. The manifold valve does several things, depending on the position that the guide chute is in. First, it will activate the cylinders 106 and 108 to shift the shoes to the full line position such as shown in FIG. 5 for stopping the flow of bottles through the guide chute. It also activates the indexing cylinder 38 to cause the guide chute to be indexed to the next lane. Upon reaching the next lane, the shoes 100 and 102 are pivoted by the pneumatic cylinders 106 and 108 to the phantom line position such as shown in FIG. 5 wherein the planar surfaces 114 thereof guides the articles into the lane.

Sometimes, in addition to utilizing the shoes 100 and 102 for stopping the articles from passing between the guide rails 60 and 62 of the guide chute, a horizontally extending elongated stop bar 152 is used for aiding in retarding the movement of the articles through the guide chute. This elongated stop bar 152 is controlled by pneumatic cylinders 154 that forces the inner surface thereof up against the articles for locking them between the side walls 60 and 62. The indexing operation is similar to that carried out in copending application Ser. No. 887,345.

In order to change the guide chute 16, first the removable clip 134 is removed from the pivot pin 64. This enables the front end of the top plate 50 to be lifted. Prior to lifting the top plate, the pivotal channel members 124 are raised so that the flexible guide plates 84 are released. The quick disconnect pivot connection 137, associated with the main cylinder 36, is released and the pneumatic tubes extending through the top plate are disconnected. Since the front end of the guide chute is releasably secured by the arcuate surface 48 extending into the channel member 66, such can be removed by merely tilting the guide chute and lifting the guide chute upwardly. Another guide chute can be readily substituted for accommodating different size articles.

What is claimed is:

1. An apparatus for aligning articles in parallel rows and said articles are being moved forward on a conveyor in a single row, a plurality of spaced apart dividers defining a plurality of parallel lanes, said divides being positioned above said conveyor, a pivotally mounted guide chute having an inlet end and an outlet end, said outlet end of said guide chute being positioned adjacent said plurality of spaced apart dividers, a fixed frame member carried above said conveyor, said guide chute including:
    (a) a top plate having a forward end pivotally mounted on said fixed frame member;
    (b) a plurality of stops carried on said top plate and being spaced apart at predetermined distances corresponding to the spacings between said spaced apart dividers;
    (c) a main power operated cylinder for pivoting said outlet end of said guide chute about an arcuate pate to different positions;
    (d) said stops being located on an arcuate path corresponding to the arc of travel of the outer end of said guide chute;
    (e) an indexing means cooperating with said main power operated cylinder for indexing said outlet end of said guide chute from alignment with one lane to another lane;
    (f) said indexing means including a movable post;
    (g) said indexing means being carried by said fixed frame member with said post extending over said top plate so that said post engages and disengages a stop carried on said top plate as said post is moved between extended and retracted positions; and
    (h) means for selectively activating said indexing means to move said post to and from said extended and retracted positions when indexing said outer end of said guide chute from alignment with one lane to the next lane.

2. The apparatus for aligning articles in parallel rows as set forth in claim 1 further comprising:
    (a) a quick release pivot connecting said forward end of said top plate to said fixed frame member;

(b) a support plate carried by said fixed frame member adjacent a distal end of said top plate from said forward end;
(c) a channel member carried by said top plate into which said support plate rides as said top plate and said guide chute are pivoted to different positions;
(d) a quick disconnect member connecting said main power operated cylinder to said top plate, and
(e) supporting frame members supporting said guide chute from said top plate;
(f) whereby said top plate, supporting frame members and said guide chute can be readily removed from said fixed frame member so that a guide chute provided for accommodating a different size article can be substituted therefor.

3. The apparatus as set forth in claim 2 further comprising:
(a) said indexing means including:
(i) a pneumatically operated cylinder;
(ii) a piston extending out said pneumatically operated cylinder; and
(iii) said movable post being carried on an outer end of said piston.

4. The apparatus as set forth in claim 1 further comprising:
(a) a quick release pivot connecting said forward end of said top plate to said fixed frame member; and
(b) supporting frame members supporting said guide chute from said top plate.

5. The apparatus as set forth in claim 4 further comprising:
(a) said guide chute including a pair of elongated spaced walls carried by said supporting frame members; and
(b) quick release locking member carried by said fixed frame member for securing a leading end of said elongated spaced walls to said fixed frame member.

6. The apparatus as set forth in claim 1 further comprising said guide chute including:
(a) an elongated channel shaped guide member carried below said top plate;
(b) said channel shaped guide member having an elongated opening facing said conveyor into which the tops of said articles being aligned extend; and
(c) said elongated channel shaped guide member aiding in maintaining said bottles in a desired position on said conveyor as said bottles are being transported on said conveyor.

7. A guide chute for use on an apparatus for aligning articles in parallel rows as said articles are being moved forward on a conveyor in a single row, a plurality of spaced apart dividers defining a plurality of parallel lanes, said dividers being positioned above said conveyor; said guide chute including a pair of elongated spaced rails having inner ends and outer ends through which said articles pass as they are being directed from said single row into said plurality of parallel lanes; a counting mechanism provided for counting the number of articles being fed into a lane; an indexing mechanism for pivoting said guide chute to another lane responsive to a predetermined number of articles being fed into a lane, and an article retaining member carried by said chute for retaining said articles in said chute upon a predetermined number of articles being fed into a particular lane from said chute, the improvement comprising said article retaining member including:
(i) a pivotally mounted shoe carried adjacent an outer end of each of said spaced rails;
(ii) said shoes having an elongated planar side surface and a curved trailing surface; and
(iii) means for pivoting said shoes between a first position wherein said planar side surfaces act as an extension of said elongated spaced rails and a second position wherein said curved trailing surfaces enter the path of travel of said articles between said rails preventing said articles from passing between said rails.

8. The guide chute as set forth in claim 7 further comprising:
(a) an angled surface interposed between said planar side surface and said curved surface; and
(b) said angled surface being at an acute angle relative to said planar side surface.

9. The guide chute as set forth in claim 7 further comprising:
(a) an elongated member carried adjacent one of said rails;
(b) power operated means for forcing said elongated member into contact with said articles passing between said rails for aiding in retarding the flow of articles between said rails.

* * * * *